United States Patent [19]

Lapeyre

[11] 4,069,673
[45] Jan. 24, 1978

[54] SEALED TURBINE ENGINE

[75] Inventor: James M. Lapeyre, New Orleans, La.

[73] Assignee: The Laitram Corporation, New Orleans, La.

[21] Appl. No.: 618,514

[22] Filed: Oct. 1, 1975

[51] Int. Cl.² .............................................. F03G 7/02
[52] U.S. Cl. ........................................ 60/641; 60/669; 290/1 A; 290/52
[58] Field of Search ................. 60/669, 641, 650, 682; 290/1 A, 2 R, 52

[56] References Cited

U.S. PATENT DOCUMENTS

| 1,804,694 | 5/1931 | Jones | 60/669 X |
| 2,499,772 | 3/1950 | Osborne | 60/641 |
| 2,707,863 | 5/1955 | Rhodes | 60/669 |
| 3,031,852 | 5/1962 | White | 60/641 X |
| 3,348,374 | 10/1967 | Schalkowsky | 60/641 |
| 3,349,247 | 10/1967 | Birkestrand | 60/669 X |
| 3,354,642 | 11/1967 | Soder | 60/682 |
| 3,479,817 | 11/1969 | Minto | 60/671 |

Primary Examiner—Allen M. Ostrager
Attorney, Agent, or Firm—Weingarten, Maxham & Schurgin

[57] ABSTRACT

A turbine engine provided within a hermetically sealed housing and operative as a closed system in response to applied solar or other thermal energy.

11 Claims, 4 Drawing Figures

Fig. 3.

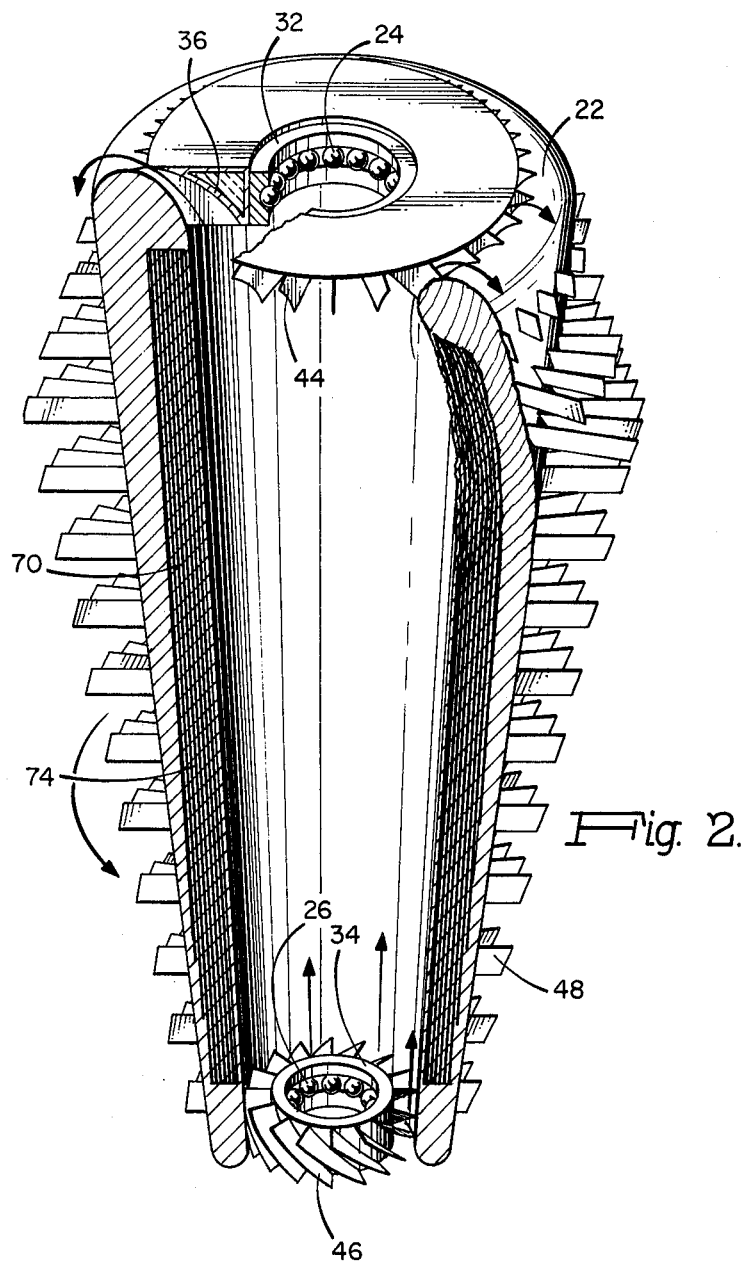

SEALED TURBINE ENGINE

FIELD OF THE INVENTION

This invention relates to a turbine engine and more particularly to a hermetically sealed self-contained turbine producing useful work from solar energy or from the combustion of a fuel.

BACKGROUND OF THE INVENTION

Turbine engines are known wherein solar energy is concentrated to provide a thermal energy source for operation of the turbine. The turbine thus energized produces intended work such as generation of electrical energy or mechanical driving of associate apparatus. In solar turbines of conventional construction the several portions of the system such as the pumping, compressing, heating and turbine units are often separate structures interconnected by associated piping to provide an entire working system. The size of such conventional systems and the interconnected arrangement of separate system elements renders these systems impractical for portable use or for ready transport to different operating locations.

SUMMARY OF THE INVENTION

In brief, the present invention provides a turbine engine of relatively simple compact construction and operative as a closed system to yield useful work in response to applied solar or other thermal energy. The turbine of the invention is disposed within a hermetically sealed housing which contains all necessary system constituents. Included within the housing is an evaporation chamber adjacent to a housing portion adapted for disposition at the focus of a solar reflector for the concentration of solar energy onto the selected housing portion for heating and evaporation of the working fluid therein. In a preferred embodiment, the novel turbine comprises a generally cylindrically shaped housing having a fixed stator and a rotor coaxially disposed around the stator and mounted for rotation with respect thereto. Cooperative turbine blades or vanes are respectively disposed on the rotor and the housing. A closed path is defined within the housing through which the working fluid is caused to circulate, the path including chambers for evaporation, expansion, cooling, condensing, pumping and compression.

In operation with the turbine disposed in association with a solar reflector, working fluid within the turbine is evaporated and expands through the cooperating vanes causing rotation of the turbine rotor. The expanding vapor is then cooled, condensed and pumped through the closed path to a compressor which returns the working fluid to the expansion chamber for a subsequent operating cycle. The turbine engine can be configured as a turbo-generator by provision of cooperative electrical windings on the stator and rotor, such that electrical energy is produced in response to engine rotation. Alternatively, an output shaft coupled to the turbine rotor can drive a separate electrical generator. The turbine output shaft can also be coupled directly or by a suitable transmission to other apparatus to be driven.

The novel turbine engine can be alternatively embodied for operation in response to heat derived from a combustion chamber rather than from a solar heat source. In this latter embodiment, an outer housing is provided about the turbine housing, the space between the housings defining an air inlet, a fuel/air mixing chamber, a fuel manifold, a combustion chamber and an exhaust. Air is drawn by suitable means into the inlet and thereafter compressed as it moves through the mixing chamber. The fuel/air mixture passes into the combustion chamber disposed adjacent to the evaporation chamber of the turbine such that heat transfer from the combustion to the evaporation chambers causes evaporation of the working fluid for commencement of a turbine operating cycle.

DESCRIPTION OF THE DRAWING

The invention will be more fully understood from the following detailed description taken in conjunction with the accompanying drawing in which:

FIG. 2 is a sectional perspective view of the embodiment of FIG. 1;

DETAILED DESCRIPTION OF THE INVENTION

Figure 1:
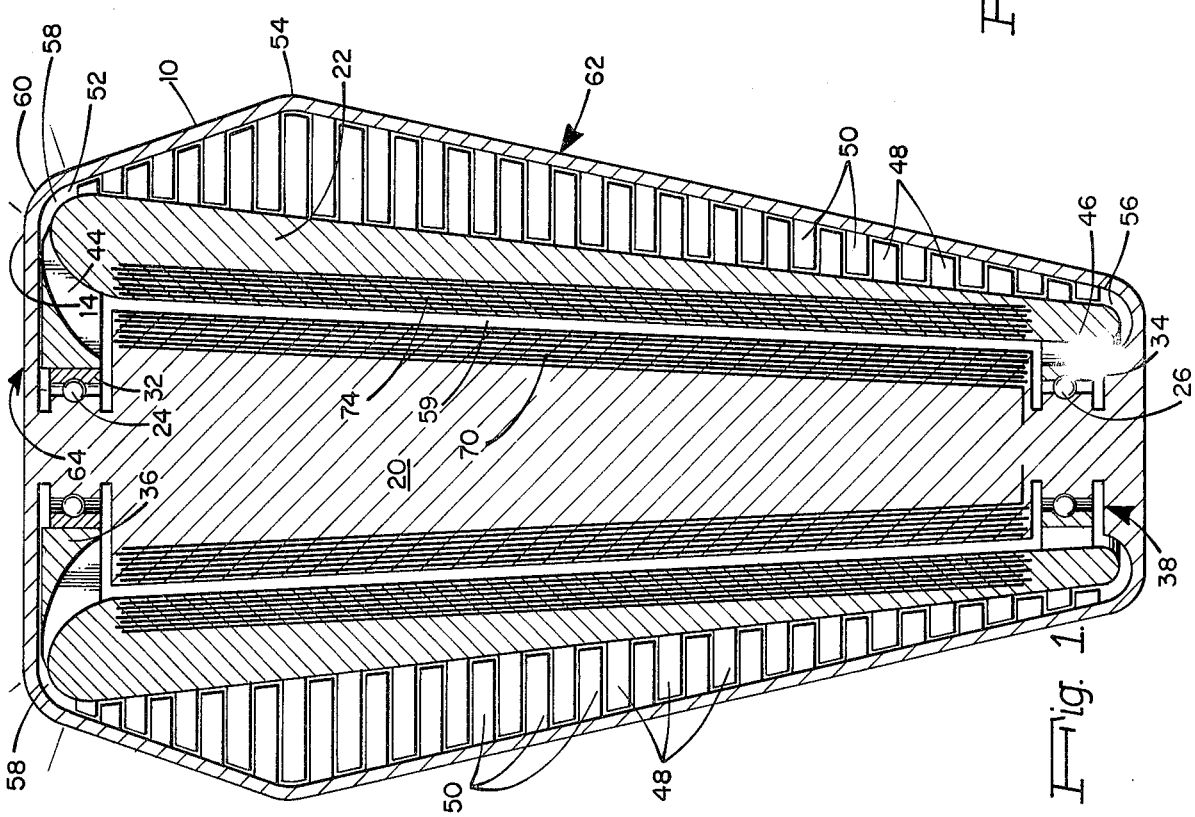
FIG. 1 is a sectional elevation view of a turbine engine of the present invention employed in conjunction with a solar reflector.
Figure 4:
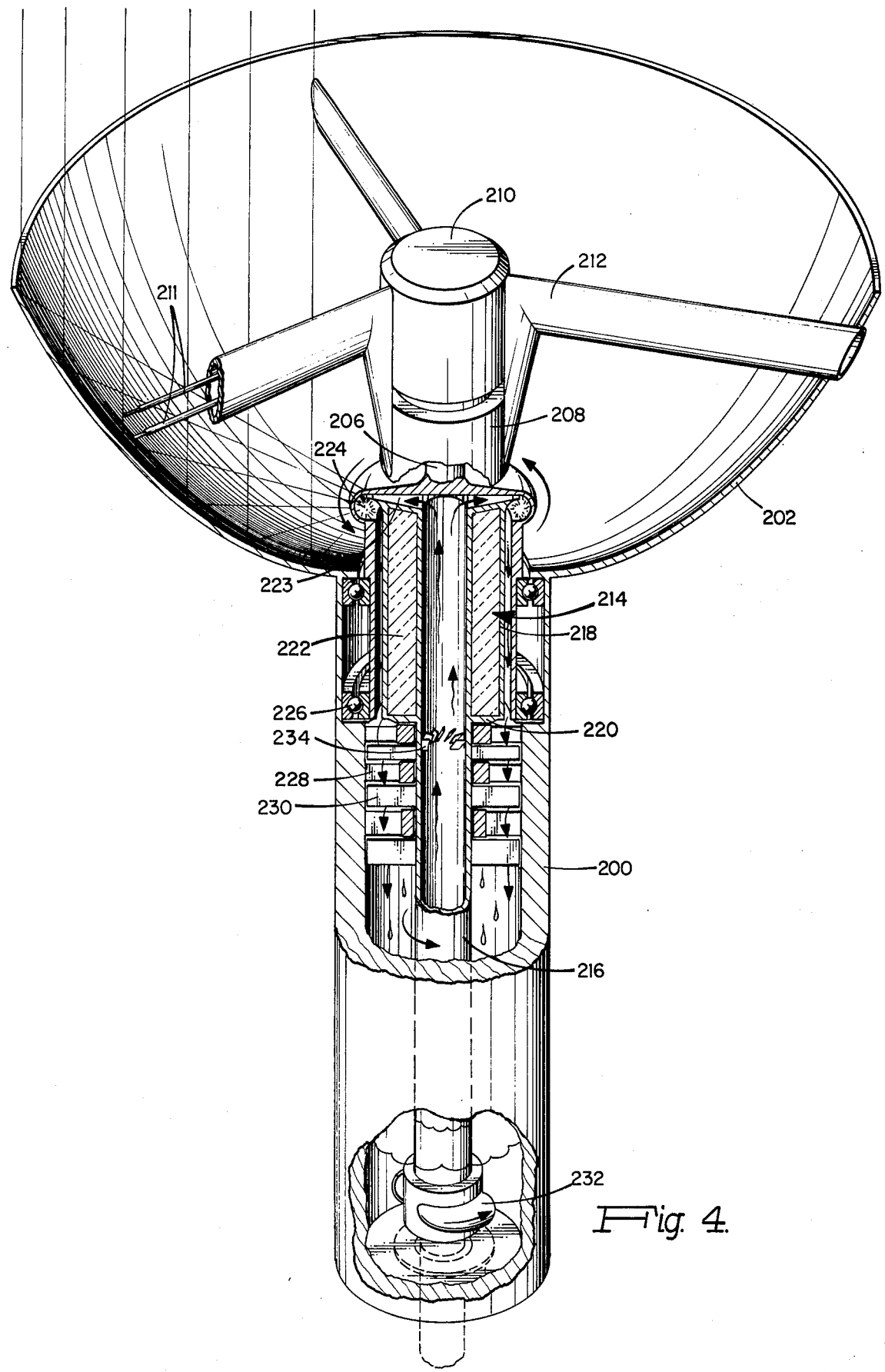
FIG. 4 is a sectional perspective view of a further embodiment of the invention employed in conjunction with a solar reflector.

Referring to FIGS. 1 and 2, there is shown a turbine engine of the invention used as part of a system for converting solar energy into electrical energy. A generally cylindrical hermetically sealed housing 10 is shown and adapted to be aligned along the center line of a parabolic solar reflector, such as shown in FIG. 4 with an end portion 14 disposed at the focus of the solar reflector. The housing 10 encloses a generally cylindrical fixed axial stator 20 and a coaxially aligned rotor 22 mounted for rotation about stator 20 by means of a first ball bearing set 24 supported at one end of housing 10 and a second ball bearing set 26 supported at the other end of housing 10.

A bearing housing 36 is supported by a first set of blades 44 affixed to the upper portion of rotor 22. A second bearing housing 34 is supported by a second set of blades 46 affixed to the lower portion of rotor 22. As will be further described below, the blade sets 44 and 46 define openings between rotor 22 and bearing housings 34 and 36 to permit the passage of a working fluid disposed within housing 10.

The blade set 44 is disposed and configured to provide a centrifugal compressor at the upper end of housing 10 for compressing the working fluid. The blade set 46 is disposed and configured to provide an axial pump for the working fluid at the lower end of housing 10. Additional blades (not shown) may be disposed in the space between stator 20 and rotor 22 to provide further pumping and compressing of the working fluid, if desired.

Still further pumping action is provided by aligning the outer wall of stator 20 and the inner wall of rotor 22 at a slight angle to the center line of the stator to provide an inclined passage therebetween to provide an axially increasing centrifugal force along the passage for pumping the working fluid as rotor 22 rotates.

A space provided between the outer wall of rotor 22 and the inner wall of housing 10 defines the turbine section of the engine. The outer wall of rotor 22 supports a plurality of turbine vanes 48 disposed therearound and extending outwardly toward the inside wall of housing 10 at spaced intervals along substantially the entire length of rotor 22. A cooperating plurality of stationary turbine vanes 50 extend inwardly from the inside wall of housing 10 toward rotor 22 in interdigitated arrangement with rotor vanes 48. The vanes 48 and 50 are angularly disposed such that as working fluid passes through the vanes, a spin will be imparted to the rotor. The turbine has a cross section diverging from an upper throat portion 52 to a point of maximum cross sectional area 54 at a predetermined distance from throat 52 and thence converging to a lower throat portion 56.

An evaporation chamber 58 is defined by the space between the uppermost surface of rotor 22 and the confronting interior surface of housing 10. Chamber 58 merges via throat 52 into the expansion chamber of the turbine section containing blades 48 and 50, and thence via throat 56 into a pumping and a compressing chamber containing blades 46. Fluid is then pumped through the annular space 59 between the confronting surfaces of the stator and rotor back into the evaporation chamber. The working fluid is thus caused to circulate in a closed thermodynamic cycle through the path provided in the housing.

In operation, solar energy concentrated on the upper portion 14 of housing 10 provides a means for heating and evaporating the working fluid, such as Freon, in evaporation chamber 58. Evaporated working fluid expands into the diverging turbine section between vanes 48 and 50 under high pressure and at high velocity. Vanes 48 and 50 are disposed at such an angle to the flow that the working fluid causes the rotor 22 to spin at a high rate about stator 20. The working fluid continues to expand through the diverging portion of the turbine section into the converging section, where it begins to cool and condense. It then passes around the bottom of rotor 22 through blade set 46 where the fluid is pumped through the space 59 between stator 20 and rotor 22 by the combined action of blades 46 and the axially increasing centrifugal force provided by the inclined passage between stator 20 and rotor 22. The fluid then passes through compressor blade set 44 and enters expansion chamber 58 at high pressure to begin the cycle again.

Housing 10 may include a radiation absorbing coating 60 in the vicinity of evaporation chamber 58 to facilitate the heating and evaporation of the working fluid. A radiating surface 62 may be provided along the turbine section for cooling of the working fluid. Alternatively, cooling fins or cooling coils may be used. A reflective surface 64 may also be provided on the upper end of housing 10 in the vicinity of the compressor section to prevent solar energy from vaporizing the working fluid in the compressor. Thus, as the working fluid circulates through the housing, solar energy is converted into the kinetic energy of spinning rotor 22. This kinetic energy is utilized in the embodiment of FIG. 1 to generate electrical energy. Stator winding 70 is provided in stator 20, while rotor winding 74 is provided on rotor 22. Stator 20 includes a magnetizable material for creating the generator magnetic field such that as rotor 22 spins, an electric current is generated in well known manner. When the turbine is used as an electrical generator, the working fluid passing between stator 20 and rotor 22 provided beneficial cooling for the generator windings. Of course, in this embodiment, the working fluid must be electrically non-conductive.

Figure 3:
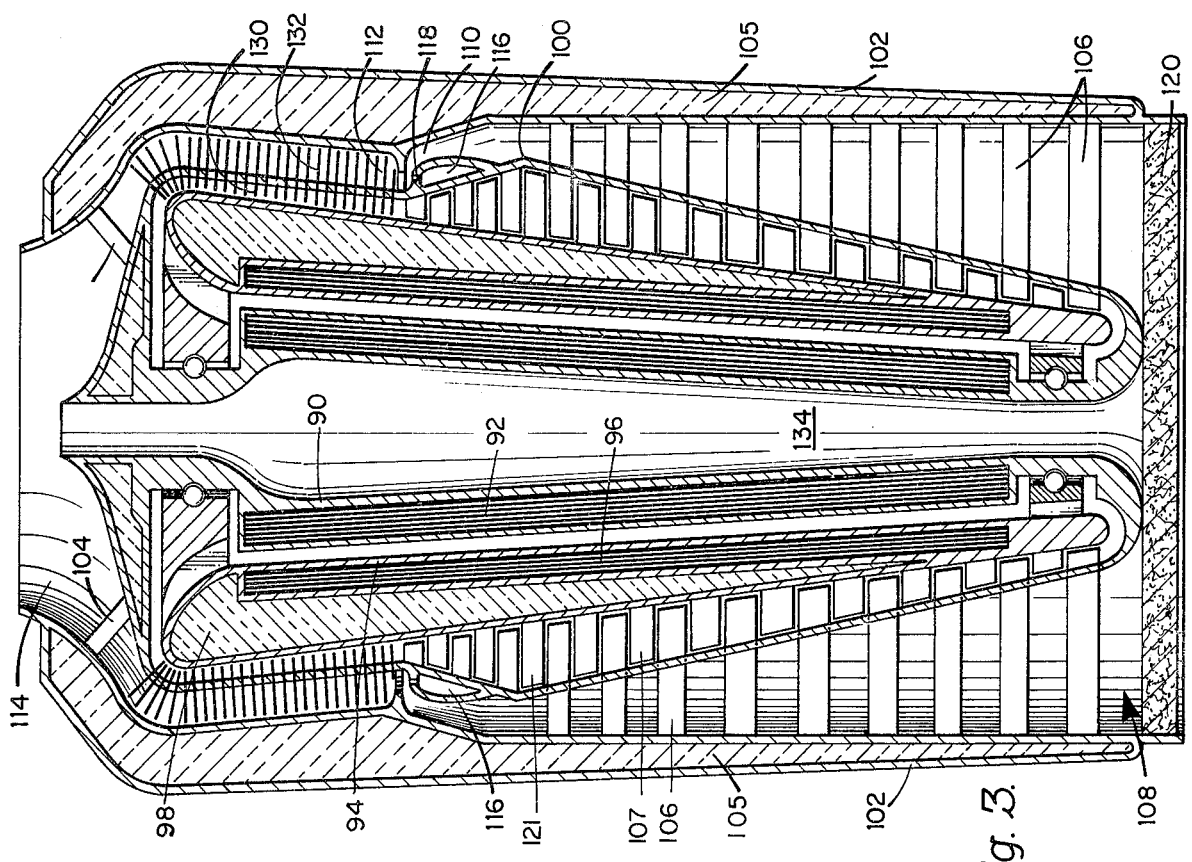
FIG. 3 is a sectional elevation view of a turbine engine of the invention employing an external combustion chamber.

Referring now to FIG. 3, there is shown an alternative embodiment of the turbine including a jet type external combustion chamber for application of heat to the turbine for evaporation of the working fluid. The turbine itself is substantially the same as in the embodiment of FIGS. 1 and 2 and includes a stator 90 having an electrical winding 92 provided thereon and a rotor 94 coaxially disposed for rotation with respect to the stator and containing an electrical winding 96 cooperative with winding 92 to provide an electrical generator. The rotor 94 in this embodiment is of hollow construction containing a thermally insulative material 98. The turbine is hermetically contained within housing 100.

An outer, generally cylindrical housing 102 is affixed to and spaced apart from housing 100 by suitable supporting means such as a plurality of stationary struts 104. A plurality of cooling vanes 106 is attached to the lower portion of housing 102 and the adjacent portion of housing 100, these vanes extending through the space between the confronting surfaces of housings 100 and 102 and into the turbine section of housing 100. The turbine rotor 94 includes a plurality of vanes 107 which are cooperative with the portion of vanes 106 within housing 100 to provide a cooperative turbine blade set. The outer housing 102 can also contain a thermally insulative material 105. The chamber between housing 100 and 102 containing vanes 106 provides a converging air inlet section 108 in the inlet end of which an air filter 120 is preferably disposed. This inlet section 108 terminates in a fuel/air mixing chamber 110 which in turn joins a combustion chamber 112 which communicates with a diverging exhaust chamber 114. A fuel manifold 116 is provided around housing 100 and having a fuel outlet 118 for dispensing a regulated quantity of fuel into the air flowing through the mixing chamber. Suitable fuel metering means (not shown) are provided for fuel regulation in well known manner.

The combustion chamber 112 is disposed adjacent the expansion chamber 121 within housing 100 such that heat is readily transferred from the combustion to the evaporation chamber to cause evaporation of the working fluid within housing 100. A plurality of heat conductors 132 can be provided through the wall of housing 100 to provide thermal conduction from combustion chamber 112 to evaporation chamber 130 in order to enhance heat transfer therebetween. The vanes 106 serve to conduct heat from the turbine section into the air inlet section 108 for preheating of the incoming air. The stator 90 may contain an axially disposed central air passage 134 for stator cooling.

In operation, air is drawn by a fan or other suitable means (not shown) into inlet section 108 and into mixing chamber 110 wherein a regulated quantity of fuel is dispensed through outlet 118 of manifold 116. The fuel/air mixture then passes into combustion chamber 112 which includes a suitable electrical or other ignition source to cause combustion of the fuel and generation of heat for application to the evaporation chamber of the turbine. Exhaust gases from the combustion chamber exit through the exhaust chamber 114.

A further alternative embodiment is shown in FIG. 4 wherein a modified turbine of the present invention is used in conjunction with solar energy. A generally cylindrical hermetically sealed housing 200 is shown with its axis aligned along the central axis of a parabolic solar reflector 202. As with the embodiment of FIG. 1, an upper portion 203 of housing 200 is disposed at the focus of solar reflector 202 for receipt of concentrated solar energy. A shaft 206 extends axially from the turbine into a speed reducing gear transmission 208 which in turn is coupled to an electrical generator 210. A plurality of struts 212 can be affixed between transmission 208, generator 210 and the periphery of reflector 202 for structural support. Shaft 206 is affixed to and rotatable with a centrally disposed rotor 214. Rotor 214 includes a generally cylindrical axially aligned hollow tube 216 extending substantially the length of housing 200. The upper end of rotor 214 includes a coaxially aligned annular section 218 radially spaced from said tube 216 and preferably containing a thermally insulative material 222. A radially extending chamber 223 couples the interior of tube 216 to evaporation chamber 224 located at the focus of solar reflector 202.

The passage 223, providing fluid communication between tube 216 and expansion chamber 224, has a cross section converging from the center line of tube 216 to a throat at the entrance to expansion chamber 224 to provide centrifugal compression of the working fluid as it enters chamber 224.

The outer wall of section 218 is supported within housing 200 by means of bearings 226 for rotation with respect to housing 200. A plurality of cooperating vanes 228 and 330 are respectively disposed on the inner wall of housing 200 and the outer wall of tube 216 to provide a turbine section. The lower end of tube 216 includes a plurality of circumferentially aligned blades 232 which provides pumping action for circulating a working fluid from a reservoir 233 at the bottom of housing 200 into tube 216. A plurality of vanes 234 is disposed on the inside wall of tube 216 at an angle to the axis of housing 200 to provide pumping action for further pumping of the working fluid through tube 216 into expansion chamber 224.

In operation, working fluid is delivered under high pressure to the inlet of the annular expansion chamber 224 located at the focus of reflector 202 where it is evaporated. The evaporated working fluid then proceeds through the annular space between the rotor and housing and through cooperating turbine vanes 228 and 230. As the working fluid flows past the turbine vanes, a spin is imparted to rotor 214. The working fluid cools after leaving the turbine section and condenses into the fluid reservoir 233. Shaft 206, affixed to the upper end of rotor 214, drives generator 210 through transmission 208 to provide an electrical power output on lines 211 in response to the solar energy concentrated on the expansion chamber of the turbine.

It will be appreciated that various modifications and alternative implementations of the invention can be provided without departing from the spirit and true scope thereof. Accordingly, it is not intended to limit the invention by what has been particularly shown and described, except as indicated in the appended claims.

What is claimed is:

1. A turbine comprising:
   a hermetically sealed housing;
   a stator affixed within said housing;
   a rotor coaxially disposed with respect to said stator within said housing;
   means for mounting said rotor for rotation about said stator;
   said means including a plurality of ball bearing housings supporting outer and inner races affixed respectively to said bearing housing and said stator; and
   a corresponding plurality of blade sets affixed to and extending inward from said rotor and affixed to said bearing housings to define openings between said rotor and said bearing housings to permit passage of working fluid;
   a first plurality of vanes affixed to and extending outward from said rotor toward the inside wall of said housing;
   a second plurality of vanes affixed to and extending inward from said housing and disposed in cooperative disposition with said first plurality of vanes;
   the confronting surfaces of said housing, stator and rotor defining a closed path within said housing; and
   a working fluid disposed in said closed path whereby under the influence of thermal energy applied to said housing along a portion of said path, said working fluid evaporates and expands through said vanes to cause said rotor to rotate about said stator.

2. A turbine according to claim 1 wherein one of said bearings is disposed at one end of said rotor and another of said bearings is disposed at the other end of said rotor and wherein the blades supporting said first bearing housing are disposed at an angle to said working fluid flow to provide means for pumping said working fluid; and
   wherein the blades supporting said second bearing housing are disposed at an angle to said working fluid flow to provide means for compressing said working fluid.

3. A turbine according to claim 1 further comprising means for heating said working fluid and including:
   a generally cylindrical outer housing coaxially affixed to and spaced apart from said hermetic housing, the confronting surfaces of said housings defining a ram-type jet external of said hermetic housing and having:
   an open air inlet passage at one end converging to a throat a predetermined distance from said inlet for compressing said air;
   a fuel/air mixing chamber downstream of said inlet throat;
   a fuel manifold having a fuel outlet for dispensing a regulated quantity of fuel into said fuel/air mixing chamber;
   a combustion chamber downstream of said mixing chamber wherein said fuel is burned to generate heat for transmission through the outer wall of said hermetic housing to said working fluid circulating therein; and
   an exhaust passage downstream of said combustion chamber through which products of combustion leave the jet.

4. A turbine according to claim 3 further including a plurality of heat conductors extending from said combustion chamber through the outer wall of said hermetic housing into said working fluid path for heating said working fluid; and
   a plurality of cooler blades extending from said air inlet passage through the outer wall of said hermetic housing into said working fluid path for cooling said working fluid.

5. A turbine according to claim 3 wherein each heat conductor and each cooler blade includes a heat pipe each having its own wick and working fluid disposed therein.

6. A turbine comprising:
   a hermetically sealed housing;

a stator affixed within said housing and extending substantially along the entire length thereof;

a rotor coaxially disposed with respect to said stator within said housing;

means for mounting said rotor for rotation about said stator;

the confronting surfaces of said housing, stator and rotor defining a closed path within said housing;

an evaporation chamber disposed at one end of said housing and along said closed path, said evaporation chamber defined by the confronting surfaces of said housing and said rotor;

an expansion chamber contiguous with said evaporation chamber and defined by the confronting surfaces of said housing and said rotor, said expansion chamber including:

a first plurality of vanes affixed to and extending outward from said rotor toward the inside wall of said housing;

a second plurality of vanes affixed to and extending inward from said housing toward said rotor and disposed in cooperative disposition with said first plurality of vanes;

a pumping chamber disposed at the opposite end of said housing along said closed path and contiguous with said expansion chamber, said pumping chamber including a plurality of centrifugal compressor blades affixed to said rotor;

a working fluid disposed in said closed path whereby under the influence of thermal energy, said working fluid expands through said vanes in said expansion chamber to cause said rotor to rotate about said stator and is pumped by said pumping chamber along the closed path between said rotor and stator to said evaporation chamber.

7. A turbine according to claim 6 further including a fan for moving air into said inlet at a predetermined flow rate.

8. A turbogenerator comprising:
a generally cylindrical closed hermetic housing;
an axially aligned stator affixed in said housing;
a rotor coaxially aligned with said stator in said housing;
a first bearing assembly containing a bearing housing and outer and inner races affixed respectively to said bearing housing and said stator at one end of said housing;
a plurality of centrifugal compressor blades affixed to and extending between said rotor and said bearing housing to define openings between said rotor and said bearing housing to define openings between said rotor and said bearing housing to permit the passage of working fluid, said blades being disposed at an angle to said working fluid flow to provide compression of said working fluid;
a second bearing assembly containing a bearing housing and outer and inner races affixed respectively to said bearing housing and said stator at the other end of said housing;
a plurality of axial pump blades affixed to an extending between said rotor and said bearing housing to define openings between said rotor and said bearing housing to permit the passage of working fluid, said pump blades being disposed at an angle to said working fluid flow to provide pumping of said working fluid;

a first plurality of vanes affixed to and extending outward from said rotor toward the inside wall of said housing;
a second plurality of cooperating vanes affixed to and extending inwardly from said housing and disposed in interdigitated disposition with said first plurality of vanes;
a working fluid disposed in said housing;
a closed path within said housing, said path including:
a first generally coaxial passage extending substantially the length of said housing between said rotor and said stator and inclined at a small angle to the center line of said stator to provide an axially increasing centrifugal force to provide further pumping action for said working fluid as said rotor rotates;
a second generally coaxial passage extending substantially the length of said housing between said vanes and having a cross section diverging from a first throat near one end of said housing to a maximum cross sectional area at a predetermined distance from said first throat and converging to a second throat near the other end of the housing;
an evaporation chamber at said one end for said working fluid;
one or more solar reflectors symmetrically aligned about said housing for concentrating solar energy on said expansion chamber for heating and evaporating said working fluid;
one or more solar reflectors symmetrically aligned about said housing for concentrating solar energy on said expansion chamber for heating and evaporating said working fluid;
said housing including along the section which supports said vanes a heat radiating outer surface for cooling said working fluid;
and along said evaporation chamber portion a heat absorbing surface to facilitate the heating of said working fluid;
and along the section supporting said compressor blades a reflective surface for insulating said working fluid;
magnetic material embedded in said stator for establishing a magnetic field in the vicinity of said stator and said rotor;
electric windings on said stator;
cooperating electric windings on said rotor to provide an electrical power generator as said rotor rotates;
and wires connected to said windings and leading out of said housing for delivering the kinetic energy associated with said rotor outside of said housing to produce useful work.

9. A turbine comprising:
a vertically supported hermetically sealed housing;
a reservoir of working fluid disposed in the bottom of said housing;
a solar reflector disposed at the top of said housing;
an axially aligned rotor mounted for rotation in the upper end of said housing and extending to the focus of said reflector;
an axially aligned shaft extending from and rotatable with the top of said rotor along the center line of said reflector;
an axially aligned hollow pumping tube extending from the bottom of said rotor to below the surface of said reservoir;

a first plurality of vanes affixed at regular intervals to and extending outwardly from said tube toward the inside wall of said housing;

a second plurality of cooperating vanes affixed to and extending inwardly from said housing and disposed in the intervals between said first plurality of vanes;

said rotor having a plurality of passages disposed therein through which said working fluid may circulate and including an axially aligned pumping chamber in fluid communication with said tube;

a centrifugal compressing chamber in fluid communication with the upper end of said pumping chamber;

an annular evaporation chamber disposed at the focus of said solar reflector and in fluid communication with said compressing chamber;

an annular axially aligned conduit for transporting evaporated fluid to said first and second plurality of vanes from said evaporation chamber;

pumping means associated with said tube for drawing working fluid from said reservoir, into said compressing chamber, into said evaporation chamber, where under the influence of applied solar energy, the working fluid evaporates and expands through said conduit to said vanes and returns to said reservoir, causing said rotor to rotate;

means associated with said shaft for converting the kinetic energy thereof to useful work.

10. A turbine comprising:

a hermetically sealed housing;

a stator affixed within said housing;

a rotor coaxially disposed with respect to said stator within said housing;

means for mounting said rotor for rotation about said stator;

a first plurality of vanes affixed to and extending outward from said rotor toward the inside wall of said housing;

a second plurality of vanes affixed to and extending inward from said housing and disposed in cooperative disposition with said first plurality of vanes;

the confronting surfaces of said housing, stator and rotor defining a closed path within said housing;

said path including a first generally coaxial passage extending substantially the length of said housing between said rotor and said stator and inclined at a small angle to the center line of said stator to provide an axially increasing centrifugal force for pumping said working fluid axially on said rotor rotation; and a working fluid disposed in said closed path whereby under the influence of thermal energy applied to said housing along a portion of said path, said working fluid evaporates and expands through said vanes to cause said rotor to rotate about said stator.

11. A turbine comprising:

a hermetically sealed housing;

a stator affixed within said housing;

a rotor coaxially disposed with respect to said stator within said housing;

means for mounting said rotor for rotation about said stator;

a first plurality of vanes affixed to and extending outward from said rotor toward the inside wall of said housing;

a second plurality of vanes affixed to and extending inward from said housing and disposed in cooperative disposition with said first plurality of vanes;

the confronting surfaces of said housing, stator and rotor defining a closed path within said housing;

a working fluid disposed in said closed path whereby under the influence of thermal energy applied to said housing along a portion of said path, said working fluid evaporates and expands through said vanes to cause said rotor to rotate about said stator;

one or more solar reflectors symmetrically aligned about said housing for concentrating solar energy on a predetermined portion thereof for heating and evaporating said working fluid;

and wherein said housing includes along the section which supports said vanes a heat radiating outer surface for cooling said working fluid;

and along said predetermined portion a heat absorbing surface to facilitate the heating of said working fluid; and along the section upstream of said predetermined portion a reflective surface for insulating said working fluid.

* * * * *

UNITED STATES PATENT AND TRADEMARK OFFICE
CERTIFICATE OF CORRECTION

PATENT NO. : 4,069,673
DATED : January 24, 1978
INVENTOR(S) : James M. Lapeyre

It is certified that error appears in the above-identified patent and that said Letters Patent are hereby corrected as shown below:

Column 7, lines 53-54, delete --to define openings between said rotor and said bearing housing--.

Signed and Sealed this

Twenty-third Day of May 1978

[SEAL]

Attest:

RUTH C. MASON
Attesting Officer

LUTRELLE F. PARKER
Acting Commissioner of Patents and Trademarks